(12) United States Patent
Clarberg et al.

(10) Patent No.: US 8,791,945 B2
(45) Date of Patent: Jul. 29, 2014

(54) RENDERING TESSELLATED GEOMETRY WITH MOTION AND DEFOCUS BLUR

(75) Inventors: Franz P. Clarberg, Lund (SE); Christopher A. Burns, Dallas, TX (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 13/110,273

(22) Filed: May 18, 2011

(65) Prior Publication Data

US 2012/0293515 A1  Nov. 22, 2012

(51) Int. Cl.
*G06T 15/00* (2011.01)

(52) U.S. Cl.
USPC .......................................... 345/419

(58) Field of Classification Search
USPC .......................................... 345/419
See application file for complete search history.

(56) References Cited

U.S. PATENT DOCUMENTS

| | | | | |
|---|---|---|---|---|
| 6,597,359 | B1 * | 7/2003 | Lathrop | 345/440 |
| 6,897,857 | B2 | 5/2005 | Srinivasa | |
| 7,145,577 | B2 | 12/2006 | Hunter | |
| 7,164,420 | B2 * | 1/2007 | Ard | 345/423 |
| 8,130,260 | B2 | 3/2012 | Krill | |
| 8,259,105 | B2 * | 9/2012 | Wald et al. | 345/420 |
| 2008/0024489 | A1 * | 1/2008 | Shearer | 345/421 |
| 2008/0043018 | A1 * | 2/2008 | Keller et al. | 345/426 |
| 2008/0278482 | A1 * | 11/2008 | Farmanbar et al. | 345/419 |
| 2010/0053162 | A1 * | 3/2010 | Dammertz et al. | 345/426 |

OTHER PUBLICATIONS

M. McGuire, E. Enderton, P. Shirley, and D. Luebke, "Real-time Stochastic Rasterization on Conventional GPU Architectures", In High Performance Graphics, 2010, p. 193-182.*
K. Fatahalian, E. Luong, S. Boulos, K. Akeley, W. R. Mark, and P. Hanrahan, Data-PArallel Rastization of Micropolygons with Defocus and Motion Blur, In High Performance Graphics, 2009, p. 59-68.*
I. Wald, S. Boulos, and P. Shirley, "Ray Tracing Deformable Scenes Usiing Dynamic Bounding Volume Hierarchies", ACM Transaction on Graphics, vol. 26, No. 1, Jan. 2007.*
PCT International Search Report and Written Opinion issued in corresponding PCT/US2012/038258 dated Dec. 27, 2012 (8 pages).
Tomas Akenine-Moller et al, "Stochastic Rasterization using Time-Continuous Triangles", Department of Computer Science, Lund University Sweden, Graphics Hardware 2007, 37 pages.
Carl J. Gribel et al., "Analytical Motion Blur Rasterization with Compression", In Proceedings of High-Performance Graphics, 2010, pp. 1-10.
Paul Haeberli and Kurt Akeley, "The Accumulation Buffer: Hardware Support for High-Quality Rendering", In Computer Graphics (Proceedings of SIGGRAPH Dallas), Aug. 6-10, 1990, vol. 24, No. 4, pp. 309-318.

* cited by examiner

*Primary Examiner* — Javid A Amini
*Assistant Examiner* — Jin Ge
(74) *Attorney, Agent, or Firm* — Trop, Pruner & Hu, P.C.

(57) ABSTRACT

A moving or defocused geometry may be stochastically rendered by grouping a plurality of primitives of that geometry in a hierarchical data structure. Visible fragments may be located in that data structure by hierarchically traversing a ray frustum through the structure. A time-dependent ray tracing data structure may be used in some embodiments.

12 Claims, 6 Drawing Sheets

RENDERING TESSELLATED GEOMETRY WITH MOTION AND DEFOCUS BLUR

BACKGROUND

This relates to graphics processing and, particularly, to rendering motion blur and defocus blur.

Correct rendering of distributed effects such as motion blur and depth of field in interactive graphics will be a major leap towards increased realism and visual fidelity. Most applications currently make the assumptions that the scene is seen through a pinhole camera with a shutter that is open for an infinitesimally short amount of time, and rely on post-processing to create the desired blur. Although several rasterization algorithms that stochastically sample in time and over the lens have been proposed, they all suffer from unpredictable performance and poor scaling with increased blur. By sacrificing the stochastic property and discretizing time and lens coordinate using accumulation buffering or interleaved sampling, a constant cost can be achieved, but this may introduce strobing artifacts.

In real-time graphics there is a prevailing trend towards using smaller primitives. This was emphasized with the introduction of tessellation in DirectX 11, which made it possible to generate a large amount of geometry on chip. However, smaller primitives put a high pressure on the rasterizer, and make shading less efficient due to the constraint of shading on 2×2 quads. The problem is reinforced with accumulation buffering or interleaved sampling, as these techniques can be seen as rendering each primitive multiple times, but in lower resolution. Also, the amount of blur introduced by motion and/or depth of field is independent of the geometric detail of the scene. Hence, stochastic rasterization of small primitives is exceedingly expensive, as the screen-space region that needs to be traversed for each blurred primitive is very large compared to the size of the primitive. A large amount of work is performed that does not result in visible samples.

DETAILED DESCRIPTION

We present an algorithm for the efficient rendering of tessellated geometry with stochastic motion blur and/or defocus blur. High-quality motion blur and depth of field rendering are key components for taking interactive graphics to the next level of realism. By adding stochastic time (t) and/or lens coordinate (u, v) to the rasterizer, correct motion and defocus blur can be resolved in some embodiments. We propose a ray casting approach, in one embodiment, which exploits the implicit spatial coherence of tessellated geometry by performing ray casting through a small local acceleration structure built per patch. Using frustum traversal and analytical time overlap computations, we arrive at a method that scales well with increased blur and smaller primitives in some embodiments.

Figure 1:
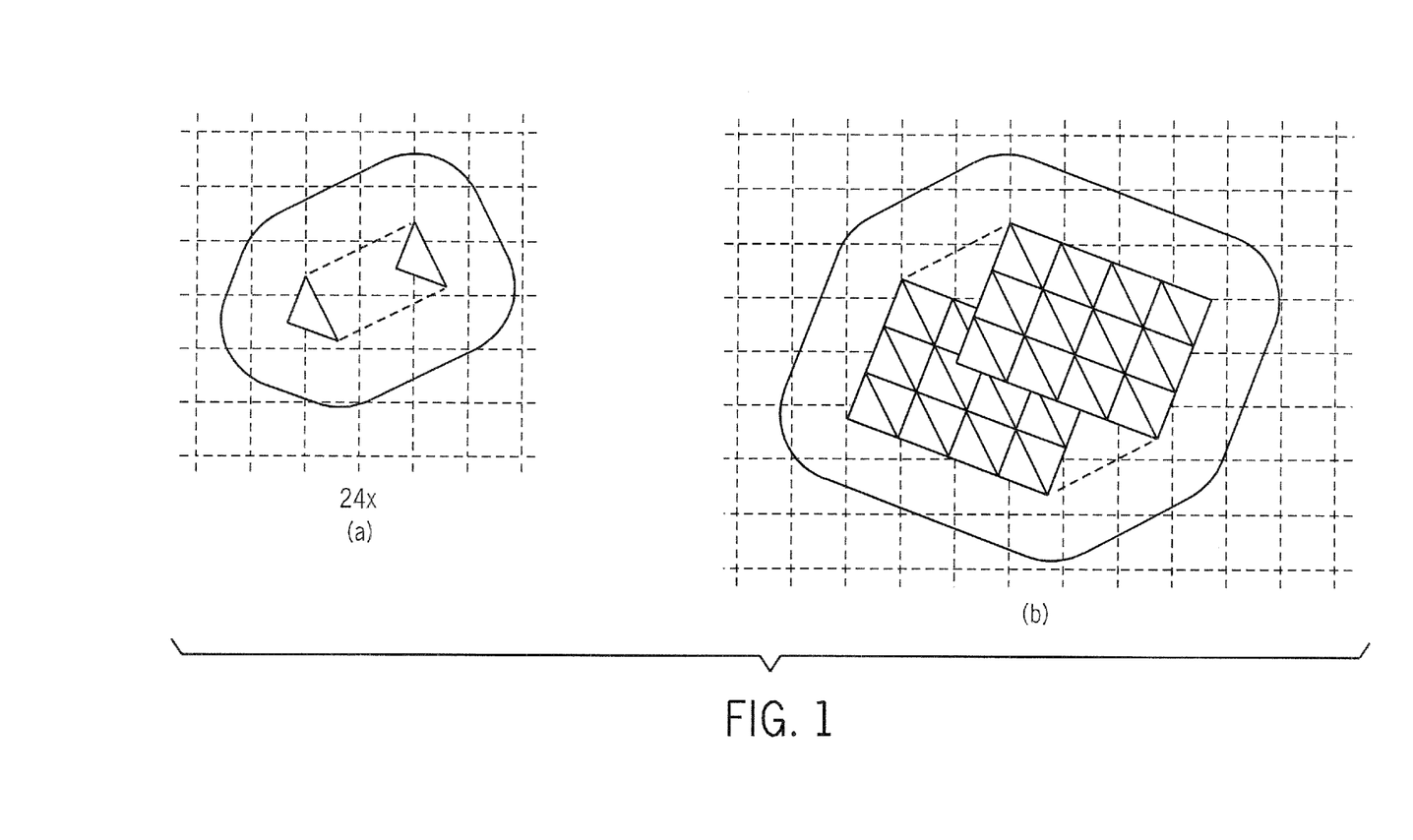
FIG. 1 illustrates a triangle in motion in FIG. 1a and a patch of 24 triangles in motion in FIG. 1b in accordance with one embodiment.

Our algorithm may operate in a streaming fashion within an otherwise traditional rasterization pipeline. The rasterization/traversal cost is amortized over a group of primitives, instead of rasterizing them one by one. By grouping primitives together, the size of the blurred region is reduced relative to the size of the primitives, and a lot of the redundant work can be avoided. This is illustrated in FIG. 1. The enclosed region illustrates the area affected by a triangle rendered with motion blur and depth of field. For each triangle in a patch, an area approximately this size needs to be traversed. In this example there are 24 triangles. With our approach, all triangles in the patch are rendered in one batch using ray casting. The gray area needs to be traversed only once, at the cost of a small additional overhead to find which primitive each sample overlaps, if any.

First, a small hierarchical data structure is built over the triangles generated from a single patch, and the screen-space region covered by the blurred patch is traversed. We use a tiled traversal to improve efficiency in some embodiments. For each screen-space tile, a tile frustum is created and hierarchically traversed through the data structure. If the frustum does not intersect, we can directly reject all samples in the tile. Otherwise, we analytically compute the overlap in time between the tile frustum and the patch and cast only the relevant rays. Hence, a very high hit rate is achieved and it is easy to guarantee that samples are coherently generated in a grid layout, which simplifies shading. In addition, in one embodiment, during frustum traversal we detect the optimal start node for the individual rays, and initiate their traversal from there instead of from the root of the hierarchical data structure. This further reduces the total traversal cost in some embodiments.

Our algorithm is a hybrid of ray tracing and rasterization in some embodiments. By working on a small local data set, we avoid the drawbacks of a global ray tracing solution, while maintaining the key performance characteristics of state-of-the-art ray tracing approaches in some embodiments. The streaming approach may also maintain coupatibility with the feed-forward rasterization pipeline of modern graphics processing units (GPUs) and graphics application program interfaces (APIs).

Figure 2:
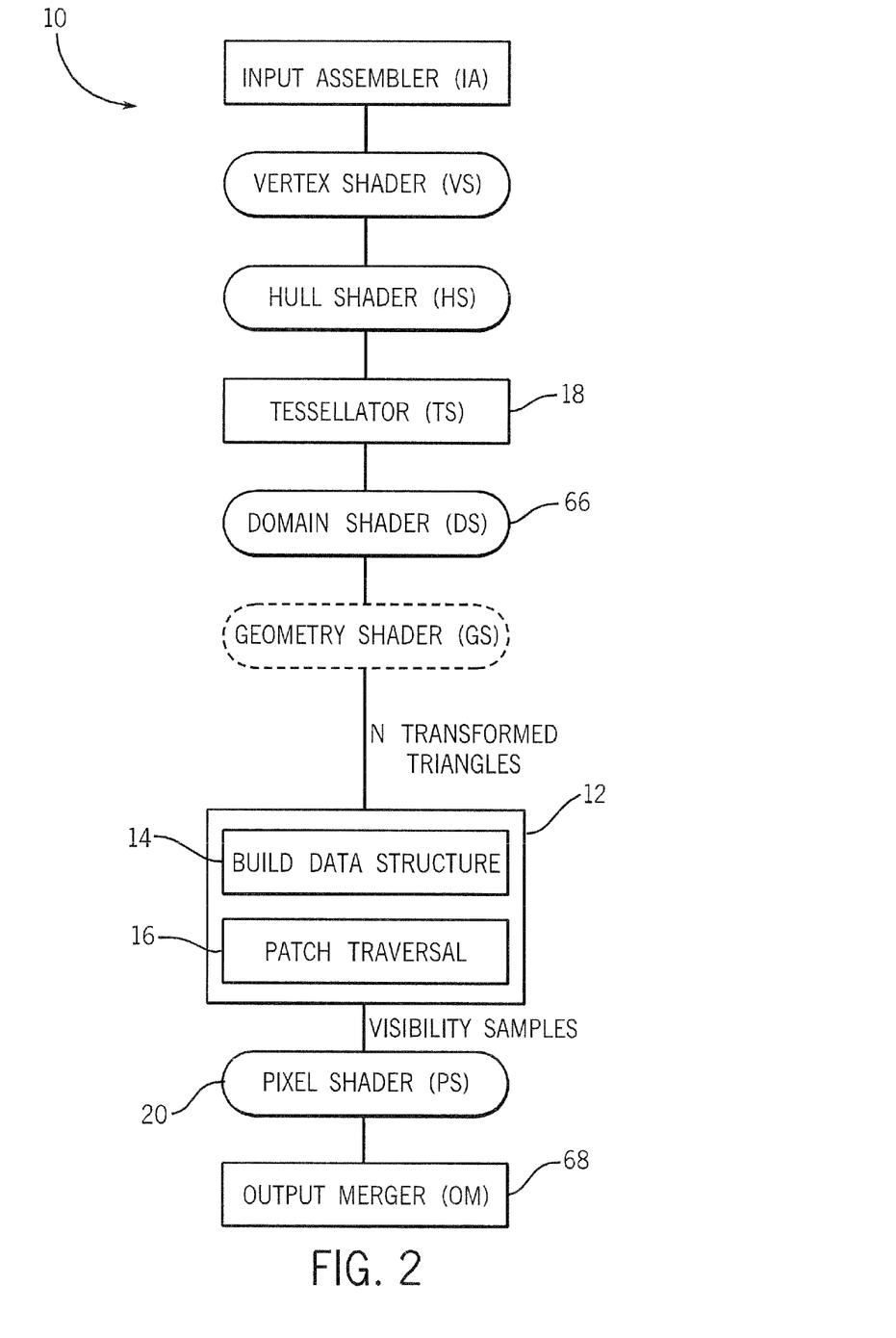
FIG. 2 is a schematic depiction of a graphics processing pipeline in accordance with one embodiment of the present invention.

FIG. 2 shows the integration of an embodiment of our invention into a modern graphics pipeline 10 that supports tessellation (Direct3D 11). Squares represent fixed-function stages, and rounded boxes represent programmable shader stages. Traditionally, the rasterizer performs visibility determination for one triangle at the time, which becomes inefficient with blur and/or micropolygons. We propose modifying the rasterizer stage 12 to process patches of tessellated triangles. The stage 12 first builds a data structure (block 14) and then traverses the patch (block 16), performing tile frustum and sample tests.

The tessellator 18 provides the spatial locality and implicit connectivity information that is required to build a compact and efficient hierarchical data structure over the patch. Note that only the rasterizer in the original pipeline needs to be modified. All other stages may be left as is, with the exception that the pixel shader 20 is able to handle samples coming from different primitives. Our method can be made entirely transparent to the application programming interfaces (APIs), which makes it attractive to developers and eases hardware adoption.

Figure 3:
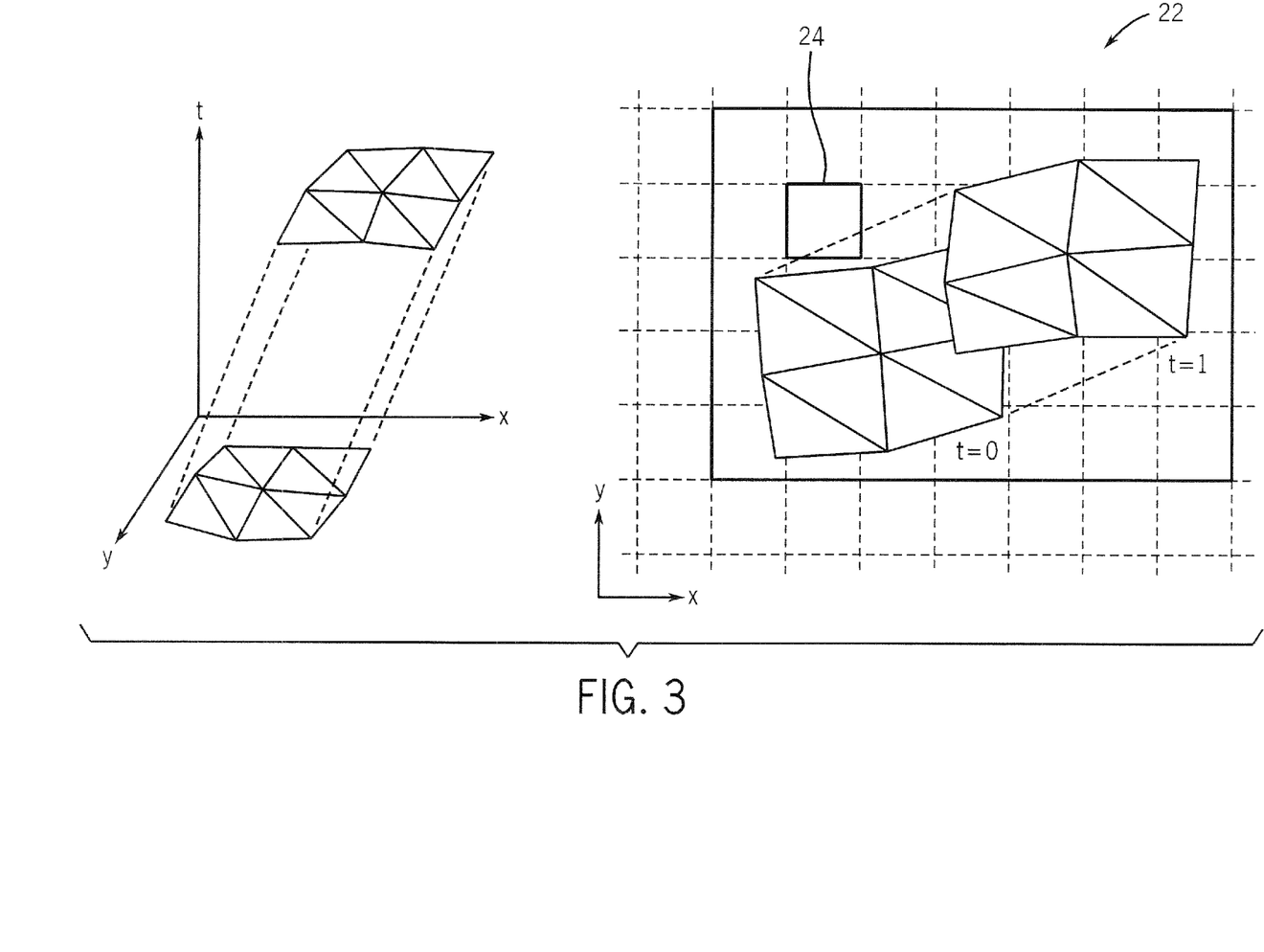
FIG. 3 shows a patch with 8 triangles that moves in space and time on the left and on the right a patch moves across the screen in screen-space.
Figure 4:
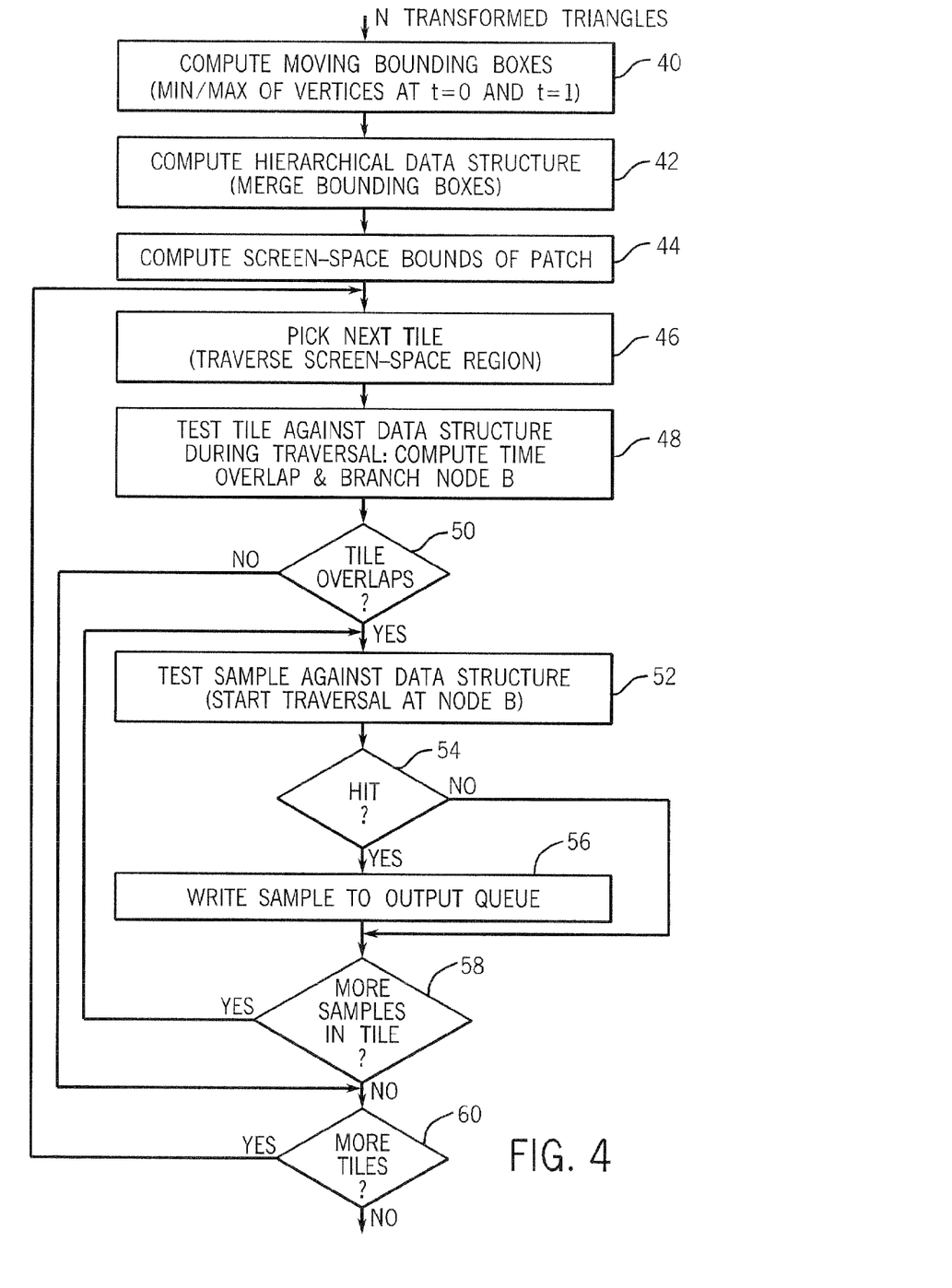
FIG. 4 is a flow chart for one embodiment of the present invention.

Our algorithm includes several parts in one embodiment, as shown in FIG. 4. The input consists of N transformed triangles that form a tessellated patch. First, a small hierarchical data structure is built over the triangles, or a subset of the triangles, generated from the tessellation of a patch (blocks 40 and 42). The data structure consists of a hierarchy of moving bounding boxes enclosing the geometry. Then, the screen-space bounds of the moving patch are determined (block 44) and this region is traversed using a tiled traversal (blocks 46 and 48). This is illustrated in FIG. 3. The left figure shows a patch with 8 triangles that moves in space-time (limited to only two spatial dimensions for illustrative purposes). Note that each vertex can be arbitrarily transformed and displaced at the start (t=0) and end (t=1) times, but we assume linear motion in between. Seen in screen-space (right figure), a patch moves across the screen. The tile-aligned bounding box 22 is traversed, and for each tile 24 we compute the potential time overlap with the moving patch.

For each tile, a frustum is created and tested for overlap against the hierarchy (FIG. 4, diamond 50). During traversal, conservative bounds for the time segment in which the geometry potentially intersects the tile are computed (block 48). Samples that overlap in both time and space are converted into rays, which are cast through the hierarchy to find the closest intersection (block 52). In this step, a number of optimizations are involved, which we will describe later. Samples that hit (diamond 54) are written to an output queue for processing by the back end (block 56). Traversal continues until there are no more samples and tiles to test (blocks 58 and 60).

The flow chart may be implemented by the following pseudo-code:

```
1    Build hierarchy over triangles in patch
2    BBOX = Compute patch bbox
3    for each tile in BBOX
4        Test tile against hierarchy
5        if tile overlaps
6            TIME = Compute time segment of overlap
7            for each sample in TIME
8                Test sample against hierarchy
```

The test tile/sample against hierarchy steps (blocks 48 and 52) perform frustum and ray traversal, respectively, through the bounding box hierarchy, much like in a traditional ray tracer. When a tile is tested, the output is either reject or a conservative time segment where overlap possibly occurs. For all tested samples that are not rejected, the output is a triangle intersection, i.e., a visibility sample.

Figure 5:
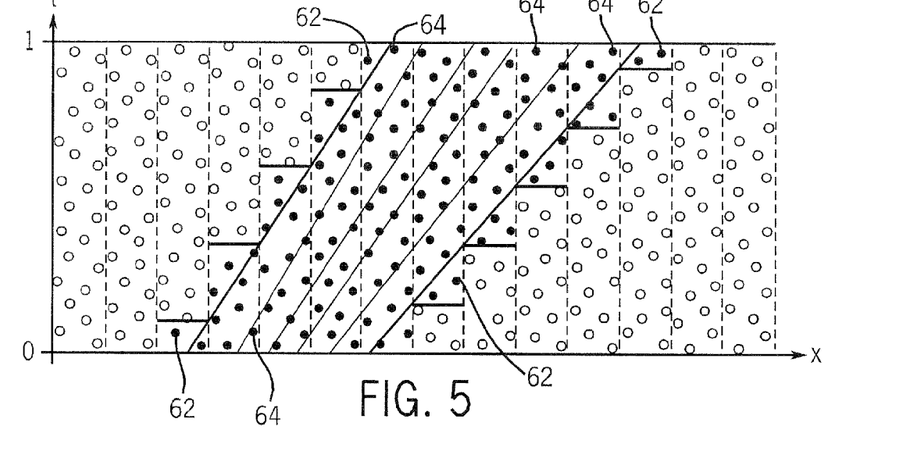
FIG. 5 is a simplified illustration of a moving patch in space and time, assuming only one spatial dimension.

FIG. 5 shows an example of the sampling process in space-time. The figure is a simplified illustration of a moving patch in space-time, assuming only one spatial dimension. The different diagonal lines illustrate the different triangles in a patch. The vertical dashed lines represent tile boundaries. For each tile, we compute the time segment, $[t_{min}, t_{max}]$, in which the patch overlaps the tile. Only samples that fall within this range are tested against the hierarchy, and hence we minimize the number of rejected samples 62. Accepted visibility samples 64 are written to an output queue (FIG. 4, block 56), to be further processed by the pipeline. The computation of per-tile time overlap can greatly reduce the number of samples that are tested, as only the samples located within the computed time segment need to be processed. No work is performed for the samples that lie outside.

As a comparison, consider how traditional stochastic rasterization methods handle this case. First, existing methods do not compute time bounds. Hence the sampled region in space-time is enclosed by vertical lines (c.f., FIG. 5), and many more samples are tested. Second, primitives are rasterized one-by-one, so there is one such large bounding box for each triangle, further multiplying the amount of inside tests performed. It is critical to reduce the volume of tested samples to improve efficiency. Interval-based rasterization does this successfully by partitioning the time domain and bounding each stratum individually, but the triangles are still rendered sequentially. Hence there is a significant overlap between the bounding boxes, especially in cases with large motion. A similar situation occurs in interleaved rasterization as triangles are individually rasterized.

Our method exploits the spatial coherency of tessellated geometry to improve the sampling efficiency in some embodiments. As a side effect, our samples will be output in coherent grids with high utilization in some cases. The trade-off is that we introduce a more expensive traversal step. It is thus important to minimize the cost of both tile frustum and per-sample traversal in some embodiments.

Next, we describe the main steps of one embodiment of our algorithm shown in FIG. 4 in greater detail. We will start with the setup done before traversal starts, i.e., construction of the hierarchical data structure and bounding of this, followed by the tile frustum and per-sample traversal methods. These are put together into a multi-level traversal algorithm, which starts ray traversal as far down in the tree as possible.

The input to our algorithm is transformed vertices for the primitives generated by tessellating a patch. For example, in a Direct3D 11-style pipeline, the transformed vertices would be produced by the domain shader (DS) 66, as indicated in FIG. 2. We assume all primitives are time-continuous with linear per-vertex motion, i.e., each vertex has two positions, qi and ri, storing the location at t=0 and t=1, respectively. The interpolated position $p_i$ at any time, t, is given by: $p_i(t)=(1-t)q_i + tr_i$. Further, we assume that if depth of field (DOF) is used, the hardware can shear the projection matrix to compute the projected position for any lens coordinate (u, v). The output from our algorithm is a number of visibility samples (FIG. 4, block 56) overlapping the patch, which form the input to the pixel back end responsible for pixel shader (PS) 20 (FIG. 2) and output merger (OM) 68 (FIG. 2).

For motion blur rendering, the primitives are assumed to be linearly moving between the start/end times. First, a bounding box, B, is computed for each primitive at t=0 and t=1 (FIG. 4, block 40). This can, for example, be done by taking the minimum and maximum of the vertex positions. Conservative bounds can then be computed at any time t by linear interpolation: $B(t)=(1-t)B(0)+tB(1)$. The data structure is built by hierarchically merging the time-dependent bounding boxes of nearby primitives (FIG. 4, block 42). The merging of two time-dependent bounding boxes is performed by separately merging their respective boxes at t=0 and t=1. The merged box at any t is given by linear interpolation, as before.

The algorithm exploits the known tessellation pattern of the tessellator stage (c.f., block 18, FIG. 2) to find primitives that are known implicitly to be spatially nearby. In most cases, all primitives tessellated from a single patch are processed as a group. If the patch contains a large number of primitives, we may divide the primitives into several groups to process only a subset of the primitives at a time. Similarly, it is possible to process several small patches together, if they are spatially nearby.

The data structure is stored in local scratch memory on-chip and reused when it is no longer needed, i.e., after the patch has been rendered. In one embodiment, the algorithm operates in 3D space and the bounding boxes are 4D hyper-trapezoids. In another embodiment, the bounding boxes are time-dependent 2D screen-space bounds, and in yet another embodiment, they are time-dependent 2D homogeneous bounds (2DH). If interleaved sampling is used, i.e., a small fixed number of discrete times, the bounds may be updated as a preprocess to the current time t, and stored as static (non-time-dependent) bounding boxes. In this case, all steps of the algorithm proceed as if we were rendering static triangles. In all cases, the bounding boxes may be axis-aligned, oriented, or oriented and sheared to be aligned with the principal axes of the geometry. The principal axes may be found using a heuristic, such as the edge directions of the input patch, or the average edge direction of the individual primitives.

In order to know which screen-space region to traverse, conservative screen-space bounds for the blurred patch must be determined (FIG. 4, block 44). The most conservative approximation is to assume the entire screen needs to be traversed, but this is inefficient if the patch only covers a small part of the screen.

One possibility is to project the corners of the top-level bounding box in the hierarchical data structure to screen space, and use min/max operations to find an axis-aligned bounding box (AABB). Other bounding shapes, for example, a convex hull or an object-oriented box (OBB), may also be used. To get tighter bounds, we can instead project the corners of the bounding boxes at a level further down in the tree. For example, if we have a binary tree, we can project the $2^l$ bounding boxes at level l (the root is l=0). There is a tradeoff between the cost of computing screen-space bounds and the cost of performing unnecessary tile frustum tests for the region outside the true patch.

In some embodiments, the screen-space bounds are computed in connection with building the hierarchical data structure instead of as a separate step, as the vertices may have to be projected anyway. Note that in all projections from 3D/2DH to 2D screen space, care has to be taken to avoid problems when the primitives cross the camera plane, z=0. In such cases, known clipping procedures (not covered by this invention) are employed. One may, for example, use a method similar to MCGUIRE, M., ENDERTON, E., SHIRLEY, P., AND LUEBKE, D. 2010. Real-Time Stochastic Rasterization on Conventional GPU Architectures. In *Proceedings of High Performance Graphics*, 173-182.

The screen-space bounds of the blurred patch is divided into tiles (e.g., 4×4 pixels), and each tile is tested against the hierarchical data structure to determine if the tile overlaps the patch (FIG. 4, blocks 46 and 48). The tiles that overlap (diamond 50) can be hierarchically subdivided into smaller tiles, or we can go directly to per-sample traversal (blocks 52-58).

In order to test a tile (block 48), we setup four frustum planes that are aligned to the sides of the tile. In additional, two planes representing the near and far clipping planes, respectively, are added. Each frustum plane, $\pi_i$, is defined by its plane equation $n_i \cdot p + d_i = 0$, where $n_1$ is the plane's normal and $d_i$ an offset. A point p is outside the plane if $n_i \cdot p + d_i > 0$ (assuming outward-facing normals). If a point is inside all planes, then it is inside the frustum.

Figure 6:
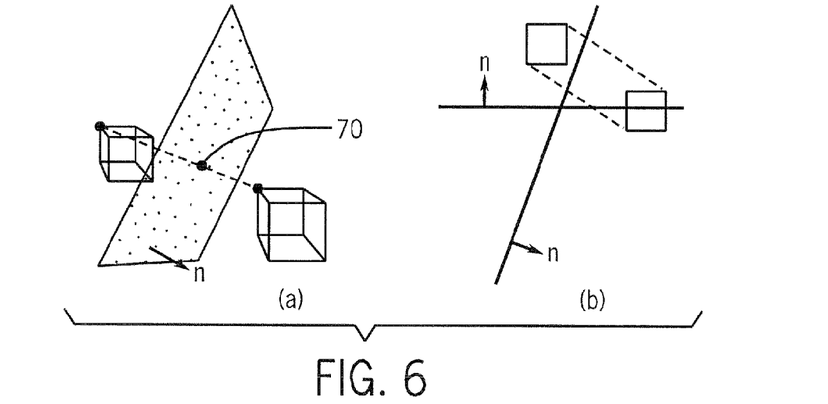
FIG. 6 shows testing each frustum plane against the vertex farthest in the negative direction relative to the plane on the left and on the right it shows a box that is only briefly inside the far plane while it is inside the other plane, only towards the opposite end of the movement.

In our case, we want to test the frustum planes against a hierarchy of linearly moving bounding boxes, and at leaf nodes compute a conservative time segment in which the moving box may intersect the frustum. In the most general case, the bounding boxes are object-oriented 4D hypertrapezoids, but similar computations are performed in the simpler cases. We start by transforming the frustum planes into the local coordinate frame of the bounding box hierarchy, which reduces the problem to plane-moving AABB tests. For static geometry, it is enough to test the corner of the AABB that is farthest in the negative direction (n-vertex) relative to $\pi_i$, in order to determine if the box intersects. The sign bits of the plane's normal, $n_i$, directly decides which corner is the n-vertex. The same holds true for linearly moving bounding boxes, as the orientations of the frustum planes and bounding boxes remain constant. In FIG. 6(a), we test each frustum plane against the vertex farthest in the negative direction relative to the plane, in order to find out if the moving box overlaps the frustum. For leaf nodes, we additionally solve for the time of intersection 70.

The n-vertex of the moving AABB is given as: $p_n(t)=(1-t)q_n+tr_n$, where $t \in [0, 1]$. Hence, to determine if a bounding box in the hierarchy intersects a frustum plane, we test the two points $p_n(0)=q_n$ and $p_n(1)=r_n$ against the plane. If both are outside, we can trivially reject the box as it can never be inside, giving the following simple inside test:

```
1    bool IsNodeInside( )
2    {
3        for each frustum plane i=1..6
4        {
5            d0 = dot(n_i,q_n) + d_i
6            d1 = dot(n_i,r_n) + d_i
7            if (d0>0 && d1>0) return false
8        }
9        return true
10   }
```

Note that it is not necessary for the plane equations to be normalized. A hardware implementation might exploit this by, e.g., setting up plane normals that always have one component equal to 1.0, thereby avoiding one multiplication per dot product. Additionally, the comparisons are normally done by moving di to the right-hand side, reducing the cost to 4 Multiply-Adds (MADDs) per frustum plane. Another minor optimization to exploit is the fact that the near and far planes are parallel. Hence, we only have to compute the dot products $q_n \cdot n_i$ and $r_n \cdot n_i$ once for these two planes, and use different $d_i$.

At leaf nodes in the hierarchy, we are additionally interested in computing the point of intersection in time, which is given by:

$$n_i \cdot ((1-t)q_n + tr_n) + d_i = 0 \quad (1)$$
$$\Longrightarrow t = \frac{d + n_i \cdot q_n}{n_i \cdot q_n - n_i \cdot r_n}.$$

Note that the nominator and both terms in the denominator are already needed in the simple test, so the only additional cost is a subtraction and a division. The division can be made in very low precision in hardware, as long as the result is always conservatively rounded. We start with the full time interval, $[t_{min}, t_{max}]=[0, 1]$, and progressively refine it using min/max operations. If the interval ever becomes empty, i.e., $t_{min} > t_{max}$, we can make an early-out. This catches some of the cases, which would normally be falsely classified as inside. An example is shown in FIG. 6(b). In this case, the box is only briefly inside the far plane, while it is inside the other plane only towards the opposite end of the movement. There is no point in time where it is inside both planes simultaneously, and hence a false positive is avoided.

The following pseudo-code illustrates the algorithm:

```
1    bool IsLeafInside(float& t_min, float& t_max)
2    {
3        [t_min,t_max] = [0,1]
4        for each frustum plane i=1..6
5        {
6            d0 = dot(n_i,q_n) + d_i
7            d1 = dot(n_i,r_n) + d_i
8            if (d0>0 && d1>0) return false
9
10           if (d0>0) // p_n moves from out to in
11               Compute t
12               t_min = max(t_min, t)
13           else if (d1>0) // p_n moves from in to out
14               Compute t
15               t_max = min(t_max, t)
16           // else: both inside, no need to update times
17
18           if (t_min > t_max) return false // early-out
19       }
20       return true
21   }
```

In the above two algorithms, we have assumed that all six frustum planes need to be tested. However, if a moving box is entirely inside a plane, it is unnecessary to test its children against the same plane, as these are guaranteed to be inside as well. Doing this at every level in the traversal and masking out the relevant planes requires testing the vertex farthest in the positive direction (the p-vertex) against the planes at t=0 and t=1, which essentially doubles the cost of the test and generally does not pay off. However, the moving patch rarely intersects the near/far planes, so we start by testing the p-vertex against these at the root level, and continue with a cheaper 4-sided frustum traversal, if possible.

At a high level, our algorithm first performs frustum traversal to identify tiles that overlap the moving patch (FIG. 4, diamond 50). In these tiles, individual rays are created and cast through the hierarchy (FIG. 4, block 52). In general, the rays in a tile will take a similar path through the tree and often only intersect one or a few leaves. Hence, it is in many cases unnecessary to start the ray traversal at the root of the tree, as all rays in a tile will take the same path for the first few levels. During frustum traversal, we find the first node in the hierarchy where the traversal of the individual rays will start to diverge. We call this the branch node, B, for the tile. In the per-sample traversal step, we start the ray traversal directly from B.

Figure 7:
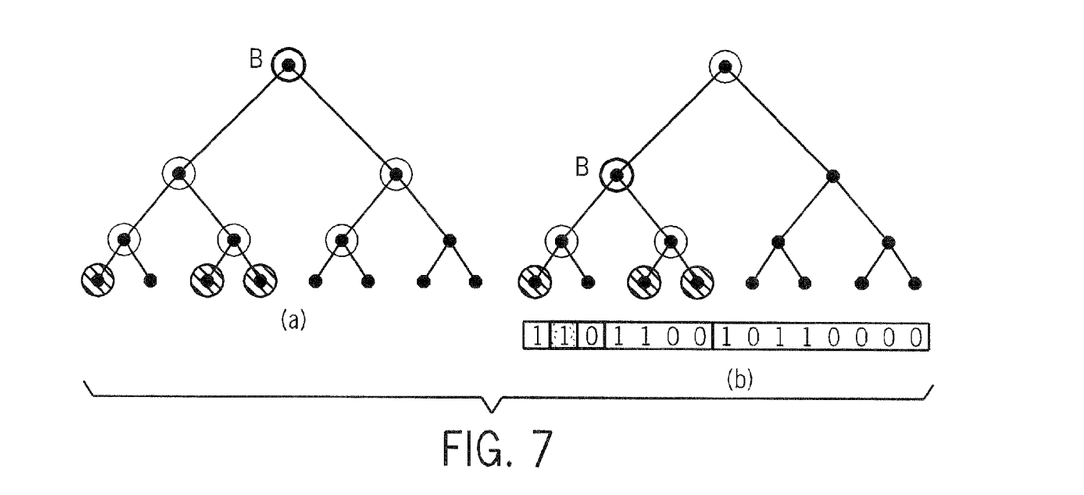
FIG. 7 shows a conservative way to find the branch node B for a tile and on the right, illustrates marking the intersected leaves in a bit mask representing the nodes linearly laid out in memory.

We propose two different ways of finding the branch node. The simplest method is to use the first node in the hierarchy where the frustum overlaps both children's bounding boxes as branch node. Incidentally, in a stack-based traversal, this is the first node in which a child node needs to be pushed on the stack. If this never occurs and the tile is not rejected, there is by construction only one intersected leaf, in which case we directly use the leaf as starting node. The drawback of this method is that the interior nodes' bounding volumes are overly conservative. A frustum may very well intersect both children, although the traversal for one of them is later terminated before reaching the leaves. Hence, rays will be started higher up in the hierarchy than necessary. This is illustrated in FIG. 7(*a*). Intersected leaves are marked with a filled circle, and intersecting interior nodes with hollow circles.

The alternative is to note exactly which leaves the frustum intersects, and then find the first node with two subtrees that has leaves overlapping the frustum. In a recursive implementation, this information would be easy to backtrack post-recursion, but in a stack-based traversal, the interior nodes are never revisited once they have been processed. Instead, we propose a simple binary method, which keeps a bit mask with n bits, where n is the number of leaf nodes. The mask represents the nodes linearly laid out in memory, and is initialized to zero. When overlapping leaves are found, they are marked by 1s. After traversal, the bit mask is hierarchically reduced using OR operations. The branch node is found by looking for the bottommost level that has only a single bit set. This is the point where per-ray traversal needs to be initiated. See FIG. 7(*b*) for an example.

It should be noted that, as the tree typically only has a handful of levels, this is an inexpensive way to find the true branch node. At each level, testing if it has a single bit set can be done by testing if x&(x−1) is equal to zero. This works since we know there is always at least one bit set, otherwise the whole tile would have been rejected.

In graphics processing unit architectures, it is common to use a hierarchical z-buffer to quickly cull tiles of pixels for geometry that is occluded. Similarly, we can cull parts of the patch early by initializing the far plane of the tile frustum to $z_{max}$ for the tile, instead of to the position of the far clipping plane. This potentially further reduces the amount of work spent on rendering occluded geometry, as fewer per-sample traversals have to be performed.

After the tile frustum traversal has determined that a screen-space tile overlaps with the moving patch (FIG. 4, diamond 50), all samples within this tile needs to be tested (FIG. 4, block 52). The exact placement of samples is orthogonal to our algorithm, and may be chosen arbitrarily. In general, we have a set of 5D sample points, $s_i=(x_i,y_i,u_i,v_i,t_i)$, where $x_i,y_i$ are screen-space coordinates, $u_i,v_i$ are lens position, and $t_i$ is sample time. If only motion blur or only depth of field is used, $u_i$, $v_i$ or $t_i$ are omitted, respectively. First, if a time overlap was computed during tile frustum traversal, all samples with a time, $t_i$, outside this range can be directly rejected. The remaining samples are converted into rays, o+zd, and transformed into the local coordinate frame of the bounding box hierarchy, if necessary.

The rays are then traversed through the hierarchical data structure in order to find leaf nodes they intersect (block 52). If a branch node, B, was computed during the tile frustum traversal, we start the traversal at this node instead of at the root node. This can significantly reduce the number of interior nodes that need to be traversed, especially for larger primitives or when the motion is limited. At leaves in the hierarchy, the samples are tested against the individual triangles. Each such test can be a standard ray-triangle intersection test executed on the triangle displaced according to t, or be done as an inside test using time-continuous edge equations in homogeneous space. Samples that hit a primitive (diamond 54) are written to an output queue for further processing by the back end (block 56). When all the samples in a tile have been tested (FIG. 4, block 58) and all the tiles have been tested (FIG. 4, block 60), we are done rendering the current patch. At this point, all temporary resources may be released and the algorithm may restart from the beginning with a new patch or subset of a patch.

One of the benefits of some embodiments our hybrid rasterization and ray casting approach, is that we can exploit the z-buffer to reduce the cost for partially or fully occluded patches. To do so, we initiate the rays' $t_{max}$ to the depth of the current sample read from the z-buffer. Hence, the traversal effectively avoids visiting nodes that are known to be occluded.

In the most general case, the nodes in our bounding box hierarchy are bounded by 4D hyper-trapezoids, i.e., oriented 3D bounding boxes at t=0 and t=1 with identical orientation that are linearly interpolated in time. We follow the standard strategy for ray-AABB intersection, which sees the bounding box as an intersection of three axis-aligned slabs. The entry and exit ray parameters are computed for each slab according to $z=(x-o_x)/d_x$, and min max operations used to find the ray's overlap, if any. In our case, the location of the slabs' planes are time-dependent functions, e.g., $[x_{min}(t), x_{max}(t)]$. The position of the planes at the sample's time ti are given by (similar for the y and z axes):

$$x_{min}(t_i) = (1-t_i)x_{min}^0 + t_i x_{min}^1,$$

$$x_{max}(t_i) = (1-t_i)x_{max}^0 + t_i x_{max}^1, \quad (2)$$

where $x_{min}^j$ and $x_{max}^j$, $j \in \{0,1\}$, are the positions of the planes along the x-axis at t=0 and t=1. For a ray with positive direction, the ray's entry point is given by:

$$t_{entry} = [(1-t_i)x_{min}^0 + t_i x_{min}^1 - o_x] \cdot \frac{1}{d_x} \quad (3)$$
$$= A x_{min}^0 + B x_{min}^1 + C.$$

and similar for the exit point, $t_{exit}$, where:

$$A = \frac{1-t_i}{d_x}, B = \frac{t_i}{d_x}, \text{ and } C = -\frac{o_x}{d_x}. \quad (4)$$

These constants only depend on the sample's parameters, so can be pre-computed before traversal starts and reused for all bounding box tests performed for the ray. In total, there are three slabs for which we compute entry/exit points according to Equation 3, at a total cost of 12 MADDs per ray-box test in the general case.

The output from our patch rendering algorithm is a number of visibility samples, i.e., sample points that overlap primitives in the tessellated patch. Note that if alpha-testing is enabled, all intersections need to be returned (not just the nearest) in order to resolve partial transparency. The design of the pixel back end is not specific to our invention. Depending on the architecture the samples may be directly shaded, either at sample frequency (super-sampled antialiasing) or at pixel frequency (multi-samples antialiasing), as done in a traditional GPU. Note that care has to be taken with respect to how derivatives are computed if the samples do not form a regular grid in screen space. McGuire et al. [2010], for example, manually compute derivatives in the pixel shader, instead of relying on the finite differences over 2×2 quads provided by the hardware.

It is also possible to entirely decouple the shading frequency from the visibility sampling frequency using a shading cache or by shading on a grid in object space. These approaches are very promising in that they can make the shading cost largely independent of the amount of blur, which is important for a high and predictable performance. They do, however, represent a larger step away from how GPUs currently operate.

We have presented an efficient method for rendering tessellated geometry with real motion blur and defocus blur. For small-triangle workloads, it combines the performance benefits of state-of-the-art ray tracing approaches, while maintaining compatibility with the feed-forward rasterization pipeline of modern GPU parts and graphics APIs in some embodiments.

We do not require a global view of the scene geometry, avoiding construction and storage of this structure. Each tessellated patch is handled one at a time, in streaming order. The time-dependent data structure may be quickly constructed immediately prior to rasterization in some embodiments. The rasterizer traverses this structure to generate visible fragments, and then the structure is discarded. Since the data structure is small and built on-demand from streaming pipeline data, it can remain on-chip and be discarded after it is consumed. Additionally, we perform frustum traversal against the time-dependent local data structure, which has not been done in this context before. In one embodiment, our data structure is constructed and traversed entirely in screen-space, resulting in increased performance in construction, storage, and in most common cases, traversal as well.

Our algorithm handles small primitives in groups in order to improve the sampling efficiency, in some embodiments. In doing so, we exploit the spatial locality among the primitives generated by a fine-grained tessellation pipeline stage. Our approach computes visibility over the temporal domain in a single pass, thereby avoiding redundant execution of any pipeline stage, in some embodiments.

Figure 8:
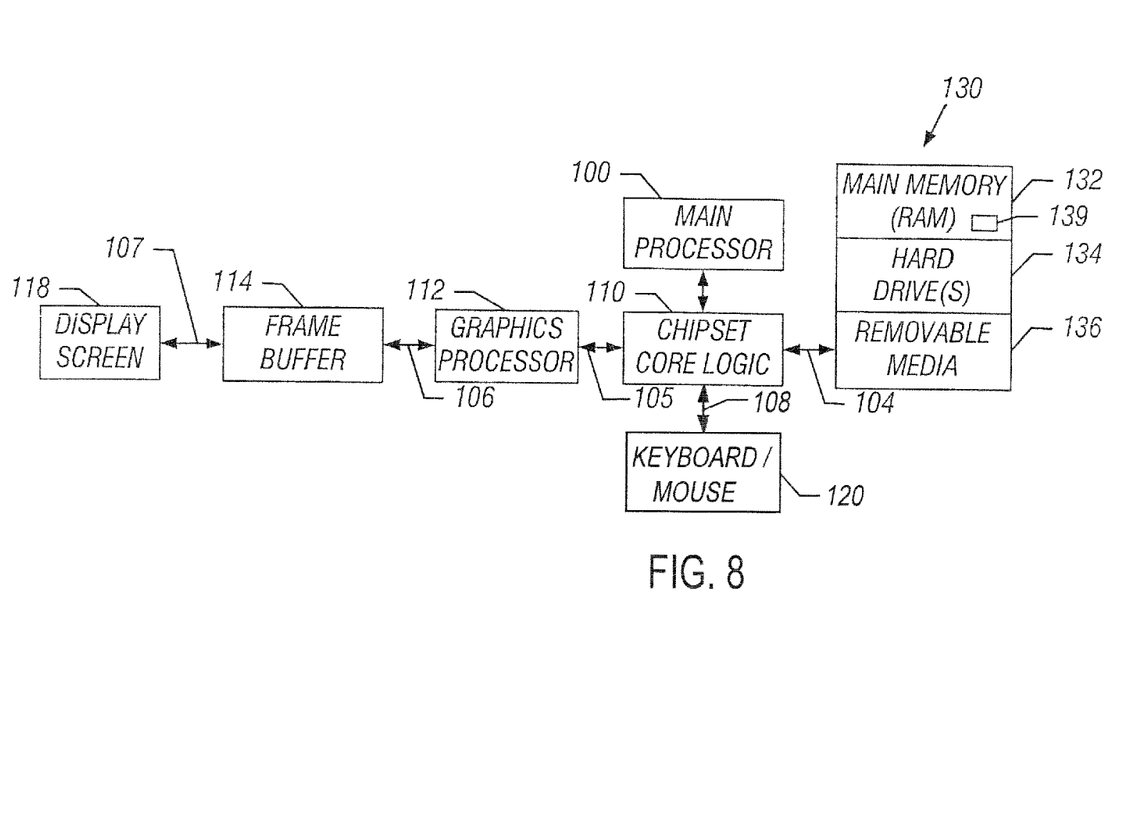
FIG. 8 is a hardware depiction for one embodiment of the present invention.

The computer system 130, shown in FIG. 8, may include a hard drive 134 and a removable medium 136, coupled by a bus 104 to a chipset core logic 110. The computer system may be any computer system, including a smart mobile device, such as a smart phone, tablet, or a mobile internet device. A keyboard and mouse 120, or other conventional components, may be coupled to the chipset core logic via bus 108. The core logic may couple to the graphics processor 112, via a bus 105, and the central processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 (as indicated at 139) or any available memory within the graphics processor. Thus, in one embodiment, the code to perform the sequences of FIG. 4 may be stored in a non-transitory machine or computer-readable medium, such as the memory 132, and/or the graphics processor 112, and/or the central processor 100 and may be executed by the processor 100 and/or the graphics processor 112 in one embodiment.

FIG. 4 is a flow chart. In some embodiments, the sequences depicted in this flow chart may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIG. 4.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   stochastically rendering a moving or defocused geometry by grouping a plurality of primitives of said geometry in a hierarchical data structure;
   traversing samples through said structure;
   performing said rendering and traversing in a rasterization pipeline;
   locating visible samples in said data structure by hierarchically traversing a frustum through the structure;
   optimizing per-sample traversal by determining a branch node during frustum traversal, and initiating per-sample traversal at the branch node;
   forming said data structure of time-dependent bounding boxes;
   testing the frustum against a hierarchy of time-dependent bounding boxes; and
   using tessellation order to avoid sorting when building the hierarchical data structure.

2. The method of claim 1 including determining screen space bounds by projecting a top level of a time-dependent bounding box hierarchy.

3. The method of claim 1 including forming said data structure entirely of two dimensional screen space bounding boxes.

4. The method of claim 1 including using time and lens parameters discretized to a fixed number of values.

5. A non-transitory computer readable medium storing instructions to enable a computer to:
   stochastically render a moving or defocused geometry by grouping a plurality of primitives of said geometry in a hierarchical data structure;
   traverse samples through said structures;
   perform said rendering and traversing in a rasterization pipeline;
   locate visible samples in said data structure by hierarchically traversing a frustum through the structure;
   optimize per-sample traversal by determining a branch node during frustum traversal, and initiating per-sample traversal at the branch node;
   forming said data structure of time-dependent bounding boxes;
   test the frustum against a hierarchy of time-dependent bounding boxes; and
   use tessellation order to avoid sorting when building the hierarchical data structure.

6. The medium of claim 5 further storing instructions to determine screen space bounds by projecting a top level of a time-dependent bounding box hierarchy.

7. The medium of claim 5 further storing instructions to form said data structure entirely of two dimensional screen space bounding boxes.

8. The medium of claim 5 further storing instructions to use time and lens parameters discretized to a fixed number of values.

9. An apparatus comprising:
   a memory; and
   a processor coupled to said memory to stochastically render a moving or defocused geometry by grouping a plurality of primitives of said geometry in a hierarchical data structure, traverse samples through the structure, perform said rendering and traversing in a rasterization pipeline, locate visible samples in said data structure by hierarchically traversing a frustum through the structure, optimize per-sample traversal by determining a branch node during frustum traversal, initiate per-sample traversal at the branch node, form said data structure of time-dependent bounding boxes, test the frustum against a hierarchy of time-dependent bounding boxes; and use tessellation order to avoid sorting when building the hierarchical data structure.

10. The apparatus of claim 9, said processor to determine screen space bounds by projecting a top level of a time-dependent bounding box hierarchy.

11. The apparatus of claim 9, said processor to form said data structure entirely of two dimensional screen space bounding boxes.

12. The apparatus of claim 9, said processor to use time and lens parameters discretized to a fixed number of values.

* * * * *